United States Patent
Kim et al.

(10) Patent No.: US 10,703,884 B2
(45) Date of Patent: Jul. 7, 2020

(54) CARBOXYLIC ACID-MODIFIED NITRILE-BASED COPOLYMER LATEX, METHOD FOR PREPARING SAME, LATEX COMPOSITION FOR DIP MOLDING CONTAINING SAME, AND DIP-MOLDED ARTICLE

(71) Applicant: LG Chem, Ltd., Seoul (KR)

(72) Inventors: Hyun Woo Kim, Daejeon (KR); Jung Eun Kim, Daejeon (KR)

(73) Assignee: LG Chem, Ltd. (KR)

(*) Notice: Subject to any disclaimer, the term of this patent is extended or adjusted under 35 U.S.C. 154(b) by 167 days.

(21) Appl. No.: 15/742,686

(22) PCT Filed: Oct. 5, 2016

(86) PCT No.: PCT/KR2016/011129
§ 371 (c)(1),
(2) Date: Jan. 8, 2018

(87) PCT Pub. No.: WO2017/090882
PCT Pub. Date: Jun. 1, 2017

(65) Prior Publication Data
US 2018/0201767 A1    Jul. 19, 2018

(30) Foreign Application Priority Data

Nov. 24, 2015 (KR) .................. 10-2015-0164396

(51) Int. Cl.
| | | |
|---|---|---|
| C08L 9/04 | (2006.01) | |
| C08L 33/18 | (2006.01) | |
| C08L 3/02 | (2006.01) | |
| C09D 107/02 | (2006.01) | |
| C08F 236/12 | (2006.01) | |
| B29C 41/14 | (2006.01) | |
| B29C 41/00 | (2006.01) | |

(52) U.S. Cl.
CPC ............... C08L 9/04 (2013.01); B29C 41/00 (2013.01); B29C 41/14 (2013.01); C08F 236/12 (2013.01); C08L 3/02 (2013.01); C08L 33/18 (2013.01); C09D 107/02 (2013.01); C08L 2201/54 (2013.01)

(58) Field of Classification Search
CPC ... C08L 9/04; C08L 33/18; C08L 3/02; C09D 107/02
USPC .......................................................... 524/47
See application file for complete search history.

(56) References Cited

U.S. PATENT DOCUMENTS

| 6,759,473 | B1 | 7/2004 | Nakamura et al. |
| 2005/0091726 | A1 | 5/2005 | Kitamura |
| 2008/0190322 | A1 | 8/2008 | Chen et al. |
| 2011/0191936 | A1 | 8/2011 | Lipinski et al. |
| 2015/0225553 | A1* | 8/2015 | Yang ................ C08L 13/02 524/52 |
| 2015/0232637 | A1 | 8/2015 | Cha et al. |

FOREIGN PATENT DOCUMENTS

| CN | 104169354 A | 11/2014 |
| JP | H06248031 A | 9/1994 |
| JP | H06248032 A | 9/1994 |
| JP | H06329834 A | 11/1994 |
| JP | H07157518 A | 6/1995 |
| JP | H11-061527 A | 3/1999 |
| JP | 3146413 B2 | 3/2001 |
| JP | 3218806 B2 | 10/2001 |
| JP | 3230321 B2 | 11/2001 |
| JP | 3230322 B2 | 11/2001 |
| JP | 3287088 B2 | 5/2002 |
| JP | 3612625 B1 | 1/2005 |
| JP | 5488137 B2 | 5/2014 |
| KR | 20100014945 A | 2/2010 |
| KR | 20110053980 A | 5/2011 |
| KR | 20140113290 A | 9/2014 |
| KR | 20140141069 A | 12/2014 |
| KR | 20150025637 A | 3/2015 |
| WO | 01/036553 A1 | 5/2001 |
| WO | WO2014/142425 * | 9/2014 |

OTHER PUBLICATIONS

Chinese Search Report for Application No. 2016800473820 dated Jul. 17, 2019, 2 pages.
Luo Yifei, "The Preparation, Structure and Properties of Starch/NBR Composites", Chinese Master's Theses Full-Text Database, 2011, No. S1, Engineering Science and Technology I, B016-200-1and its English abstract, 84 pages.
International Search Report From PCT/KR2016/011129 dated Jan. 12, 2017.
M.A. Misman, et al., "The physical and degradation properties of starch-graft-acrylonitrile/carboxylated nitrile butadiene rubber latex films", Carbohydrate Polymers, vol. 128 (2015) pp. 1-10.

* cited by examiner

Primary Examiner — Deve V Hall
(74) Attorney, Agent, or Firm — Lerner, David, Littenberg, Krumholz & Mentlik, LLP

(57) ABSTRACT

The present invention relates to a carbonic acid-modified nitrile-based copolymer latex, a process for producing the same, a latex composition for dip-molding comprising the latex composition and a molded article produced therefrom. More specifically, modified nitrile-based copolymer latex, which can improve the stability of latex even with the use of inorganic pigments by making the inherently modified nitrile-based copolymer latex, enables the production of a dip-molded article having a smoothness of syneresis, less stickiness, and excellent tensile strength, a process for producing the same, a latex composition for dip-molding comprising the same, and a molded article made therefrom.

11 Claims, No Drawings

CARBOXYLIC ACID-MODIFIED NITRILE-BASED COPOLYMER LATEX, METHOD FOR PREPARING SAME, LATEX COMPOSITION FOR DIP MOLDING CONTAINING SAME, AND DIP-MOLDED ARTICLE

CROSS-REFERENCE TO RELATED APPLICATIONS

This application is a national phase entry under 35 U.S.C. § 371 of International Application No. PCT/KR2016/011129, filed Oct. 5, 2016, which claims priority to Korean Patent Application No. 10-2015-0164396, filed Nov. 24, 2015, the disclosures of which are incorporated herein by reference.

TECHNICAL FIELD

The present disclosure relates to a carbonic acid-modified nitrile-based copolymer latex which maintains high dispersion stability even with use of an inorganic pigment, a process for producing the same, a latex composition for dip-molding comprising the same, and a dip-molded article.

BACKGROUND ART

Disposable rubber gloves used in daily life such as housework, food industry, electronics industry, medical field, etc. are made by dip-molding of natural rubber or a carbonic acid-modified nitrile-based copolymer latex. In recent years, due to allergy issues and unstable supply/demand problems of natural rubber, carbonic acid-modified nitrile-based gloves are in the spotlight on the disposable glove market.

Currently, nitrile gloves companies are constantly striving to reduce costs as well as enhance quality as competition between companies becomes more intense.

Typical markets for nitrile rubber gloves are the thick gloves represented by industrial applications and the thin glove market represented by medical applications, and the approach is different for each application area for cost reduction.

In general, nitrile rubber gloves are made by adding inorganic pigments such as calcium carbonate to latex compositions for dip-molding to keep the gloves thick while lowering the manufacturing cost. However, since the latex composition for dip-molding is low in stability against calcium cations in calcium carbonate, calcium carbonate coagulates to generate a large amount of coagulation (agglutination, flocculation, agglomeration or coalescence).

The coagulated product appears as a pinhole after the dip-molding step to increase the defective rate of the glove, and if the generation of the coagulated product is serious, the manufacture of the glove itself becomes impossible. As a result, the amount of calcium carbonate used for cost reduction is extremely limited.

On the other hand, the nitrile glove maker produces a thinner glove than the thicker glove, thus reducing the cost by reducing the weight of the glove.

Thin gloves can be manufactured by very low concentrations of latex, which causes syneresis, severe depletion of water during the formation of glove films during dip-molding processes. This generates a coagulum of the latex composition to produce multiple pinholes of the final glove, thereby increasing the rejection rate of the glove.

In general, the syneresis tends to be improved by increasing the particle size of the latex, in this case, gloves made of latex of large particles are accompanied by a problem of lowering tensile strength. Therefore, glove makers are continuously interested in carbonic acid-modified nitrile-based latex which does not deteriorate the tensile strength of the final glove while delaying the syneresis during dip-molding even if the glove is made thin.

The present applicant has proposed a technique using a carbonic acid-modified nitrile-based copolymer latex and starch in Korean Patent Publication No. 2014-0113290. In the above patent, the use of starch solves the problem of the syneresis and the tensile strength to some extent, and it is possible to reduce the stickiness during the production of the dip-molded article.

However, this patent merely mixes latex and starch with latex compositions for dip-molding and does not suggest the use of inorganic pigments such as calcium carbonate.

In addition, when calcium carbonate is used for cost reduction as mentioned above, there is a problem that dispersion stability is low when mixed with latex. Therefore, even if starch is used, the dispersion stability according to the use of calcium carbonate and the problem of the defect of the dip-molded article are conventionally retained.

Therefore, even if calcium carbonate is used to reduce the cost regardless of the thickness of the glove, it is urgent to develop a technique for improving the dispersion stability of latex as well as physical properties such as syneresis and tensile strength.

PRIOR ART LITERATURE (Patent Document 1) Korean Laid-Open Patent Publication No. 2014-0113290, entitled "Latex composition for dip-molding and dip-molded articles produced therefrom"

DISCLOSURE

Technical Problem

The present inventors have conducted various studies to solve the above problems. As a result, we have found that when the latex is produced by carrying out the polymerization using the starch whose molecular weight is controlled during the emulsion polymerization process of the copolymer, even if an inorganic pigment such as calcium carbonate is added for cost competitiveness, not only the high dispersion stability is maintained, it was confirmed that the physical properties of the molded article were improved and the workability of the dip-molding step was improved, thereby completing the present invention.

Technical Solution

According to one aspect of the present disclosure, there is provided a carbonic acid-modified nitrile-based copolymer latex copolymerized with a starch with controlled molecular weight.

According to another aspect of the present disclosure, there is provided a latex composition for dip-molding having high dispersion stability even when an inorganic pigment is used including the carbonic acid modified nitrile-based copolymer latex.

According to another aspect of the present disclosure, there is provided a molded article which is produced from the latex composition for dip-molding and can achieve cost reduction and has excellent tensile strength properties regardless of thickness and has reduced stickiness.

According to another aspect of the present disclosure, there is provided a process for producing a dip-molded article excellent in workability using a latex composition for dip-molding.

The present disclosure provides a carbonic acid-modified nitrile-based copolymer latex, which is prepared by adding starch at the time of copolymerization and has a glass transition temperature of −50 to −15° C. and an average particle size of 50 to 500 nm.

Also, the present disclosure provides a latex composition for dip-molding comprising a carbonic acid-modified nitrile-based copolymer latex.

Also, the present disclosure provides a dip-molded article produced by dip-molding of the above latex composition for dip-molding.

Further, the present disclosure provides a method of producing a dip-molded article including:

a) applying and drying a coagulant solution to a mold;

b) applying a latex composition for dip-molding to the coagulant-applied mold to form a dip-molded layer;

c) cross-linking the dip-molded layer; and d) peeling off the cross-linked dip-molded layer from the mold to obtain a dip-molded article, wherein the latex composition for dip-molding is a latex composition as described aforementioned.

Advantageous Effects

A carbonic acid-modified nitrile-based copolymer latex according to any embodiment of the present disclosure has excellent dispersion stability even when an inorganic pigment is used for cost reduction by using starch as a particle stabilizer in the copolymerization process.

Dip-molded article produced using such latex exhibit excellent tensile strength regardless of their thickness, and not only the stickiness is reduced, but also the article defects caused by the use of conventional inorganic pigments are largely reduced and cost savings can be ensured.

Furthermore, The workability is improved due to the smooth syneresis during the dip-molding process, and therefore, when the work is performed at the low concentration, the problem of the workability due to the short syneresis is lowered and the problem of high defect rate.

BEST MODE

In the present invention, a starch having a molecular weight controlled as a particle stabilizer is used in the production of a carbonic acid-modified nitrile-based copolymer latex.

A Carbonic Acid-Modified Nitrile-Based Copolymer Latex.

The carbonic acid-modified nitrile-based copolymer latex according to the present disclosure is prepared by adding an emulsifier, a reactive compound, a polymerization initiator, a molecular weight modifier, and other additives to a monomer, followed by emulsion polymerization. In this case, starch is used as a particle stabilizer in the latex manufacturing process.

A starch is a natural polymer represented by the following formula (1)

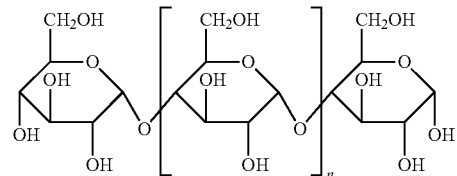

The starch is a hydrophilic polymer, and when it is present in an aqueous solution, the starch is bonded directly or via water molecules to each other through hydrogen bonding to form micelles. Such micelles are present in the copolymer latex prepared after emulsion polymerization, and adsorbed on the surface of the inorganic particles when the inorganic particles are added to the latex for dip-molding, thereby increasing the repulsive force between the particles. Accordingly, the particles are prevented from agglomerating due to the electrostatic force between the particles caused by the conventional inorganic particles, thereby enhancing the dispersion stability of the latex composition for dip molding.

In addition, there is a possibility that the starch is not uniformly dispersed in the copolymer latex due to the nature of the starch, so that it is more advantageous to add it in the polymerization step than in the latex obtained after the polymerization of the carbonic acid-modified nitrile-based copolymer. According to the preferred experimental examples of the present disclosure, it was confirmed that the dip-molded articles of Examples 1 to 6 prepared by adding starch to the polymerization step were superior in dispersion stability when calcium carbonate, which is an inorganic pigment, was used in comparison with the dip-molded articles of Comparative Examples 3 and 4 in which latex and starch were simply mixed (See the results in Table 1).

In particular, the starches proposed in the present disclosure are required to enhance the stability of the finally obtained latex without affecting the polymerization of the carbonic acid-modified nitrile-based copolymer latex, which can be achieved by using starches having a limited molecular weight.

Preferably, the starch according to the disclosure has a weight average molecular weight of 300 to 30,000 g/mol, more preferably 500 to 20,000 g/mol, most preferably 1,000 to 10,000 g/mol. Stable polymerization of the carbonic acid-modified nitrile-based copolymer latex is possible when the molecular weight is within this range. At this time, the molecular weight of the starch was measured by Gel Permeation Chromatography.

These starches can be used either as a commercial product or as a controlled molecular weight after purchase.

The starch may be one or a mixture of two or more selected from the group consisting of rice starch, barley starch, corn starch, waxy corn starch, tapioca starch, potato starch, sweet potato starch, wheat starch and modified starches thereof, but is not limited thereto.

The modified starch may be selected from the group consisting of oxidized starch, acid-treated starch, ester starch, ether starch, phosphoric acid bridged starch and acetyl adipate starch, but is not limited thereto.

The starch is limited its content in order to improve the stability of latex when adding inorganic particles without affecting emulsion polymerization. Preferably, the starch is used in an amount of 1 to 30 parts by weight, more preferably 5 to 15 parts by weight, based on 100 parts by weight of the total amount of the monomers. If the content is less than the above-mentioned range, the above-mentioned effect cannot be obtained. On the other hand, if the content is in excess of the above range, the tensile strength of the produced dip-molded article may be lowered.

In addition, the starch presented in the present disclosure may be a starch solution or a starch suspension, preferably a starch aqueous solution. The starch solution or the starch suspension can be administered during the emulsion polymerization using the concentration of 0.1 to 60% by weight, preferably 1 to 55% by weight.

The emulsion polymerization of the carbonic acid-modified nitrile-based copolymer is carried out using the starch as a particle stabilizer.

In the carbonic acid-modified nitrile-based copolymer, three or more kinds of monomers are used, and specifically a conjugated diene-based monomer, an ethylenically unsaturated nitrile-based monomer and an ethylenic unsaturated acid monomer are copolymerized.

A conjugated diene-based monomer, which is one monomer that constitutes a carbonic acid-modified nitrile-based copolymer latex according to any embodiment of the present disclosure, may include, for example, one or more selected from the group consisting of 1,3-butadiene, 2,3-dimethyl-1,3-butadiene, 2-ethyl-1,3-butadiene, 1,3-pentadiene and isoprene, and 1,3-butadiene and isoprene may be used, and for instance, 1,3-butadiene may be used.

The above conjugated diene-based monomer accounts for 40 to 89% by weight, for example, 45 to 80% by weight, or 50 to 78% by weight, based on total monomers constituting a carbonic acid-modified nitrile-based copolymer. If the amount is less than the above ranges, the resulting dip-molded article becomes hard and exhibits poor wearing sensation. On the contrary, if the amount is more than the above ranges, the resulting dip-molded article has poor oil resistance and decreased tensile strength.

An ethylenically unsaturated nitrile-based monomer, which is another monomer that constitutes a carbonic acid-modified nitrile-based copolymer latex according to any embodiment of the present disclosure, may include one or more selected from the group consisting of acrylonitrile, methacrylonitrile, fumaronitrile, α-chloronitrile, α-cyanoethyl acrylonitrile, and combinations thereof, and among these, acrylonitrile and methacrylonitrile may be used, and for instance, acrylonitrile may be used.

An ethylenically unsaturated nitrile-based monomer accounts for 10 to 50% by weight, for example, 15 to 45% by weight, or 20 to 40% by weight, based on total monomers constituting a carbonic acid-modified nitrile-based copolymer. If the amount is less than the above ranges, the resulting dip-molded article has poor oil resistance and decreased tensile strength. On the contrary, if the amount is more than the above ranges, the resulting dip-molded article exhibits the problems such as becoming hard, poor wearing sensation, etc.

An ethylenically unsaturated acid monomer, which is another monomer that constitutes a carbonic acid-modified nitrile-based copolymer according to any embodiment of the present disclosure, has one or more acidic groups selected from the group consisting of a carboxyl group, a sulfonic acid group and an acid anhydride group.

The above ethylenically unsaturated acid monomer may include, for example, an ethylenically unsaturated carbonic acid monomer such as acrylic acid, methacrylic acid, itaconic acid, maleic acid, fumaric acid, etc.; a polycarboxylic anhydride such as maleic anhydride, citraconic anhydride, etc.; an ethylenically unsaturated sulfonic acid monomer such as styrenesulfonic acid, etc.; an ethylenically unsaturated polycarbonic acid partial ester monomer such as monobutyl fumarate, monobutyl maleate, mono-2-hydroxypropyl maleate, etc., and methacrylic acid may be used. Such ethylenically unsaturated acid monomer may be used in the form of, for example, alkali metal salts or ammonium salts.

The above ethylenically unsaturated acid monomer accounts for 0.1 to 10% by weight, for example, 0.5 to 9% by weight, or 1 to 8% by weight, based on total monomers constituting a carbonic acid-modified nitrile-based copolymer. If the amount is less than the above ranges, the resulting dip-molded article has decreased tensile strength. On the contrary, if the amount is more than the above ranges, the resulting dip-molded article becomes hard and exhibits poor wearing sensation.

A carbonic acid-modified nitrile-based copolymer according to any embodiment of the present disclosure may optionally further include other ethylenically unsaturated monomer copolymerizable with the above ethylenically unsaturated nitrile monomer and ethylenic unsaturated acid monomer.

A copolymerizable ethylenically unsaturated monomer may include a vinyl aromatic monomer selected from the group consisting of styrene, alkyl styrene and vinyl naphthalene; fluoroalkyl vinyl ether such as fluoro ethyl vinyl ether, etc.; an ethylenically unsaturated amide monomer selected from the group consisting of (meth)acrylamide, N-dimethylol (meth)acrylamide, N,N-dimethylol (meth)acrylamide, N-methoxymethyl (meth)acrylamide and N-propoxymethyl (meth)acrylamide; a nonconjugated diene monomer such as vinylpyridine, vinylnorbornene, dicyclopentadiene, 1,4-hexadiene, etc.; an ethylenically unsaturated carbonic acid ester monomer including methyl (meth)acrylate, ethyl (meth)acrylate, butyl (meth)acrylate, 2-ethylhexyl (meth)acrylate, trifluoroethyl (meth)acrylate, tetrafluoropropyl (meth)acrylate, dibutyl maleate, dibutyl fumarate, diethyl maleate, methoxymethyl (meth)acrylate, ethoxyethyl (meth)acrylate, methoxyethoxyethyl (meth)acrylate, cyanomethyl (meth)acrylate, 2-cyanoethyl (meth)acrylate, 1-cyanopropyl (meth)acrylate, 2-ethyl-6-cyanohexyl (meth)acrylate, 3-cyanopropyl (meth)acrylate, hydroxyethyl (meth)acrylate, hydroxypropyl (meth)acrylate, glycidyl (meth)acrylate, dimethylaminoethyl (meth)acrylate, etc.

The above other ethylenically unsaturated monomer copolymerizable with the above ethylenically unsaturated nitrile-based monomer and ethylenically unsaturated acid monomer may be used in an amount of 0.001 to 20% by weight based on total monomers constituting a carbonic acid-modified nitrile-based copolymer; if the amount exceeds 20% by weight, the balance is not well maintained between soft wearing sensation and tensile strength.

As mentioned previously, a carbonic acid-modified nitrile-based copolymer latex according to any embodiment of the present disclosure may be produced by the addition of an emulsifier, a polymerization initiator, a molecular weight modifier, etc. to monomers constituting a carbonic acid-modified nitrile-based copolymer, followed by emulsion polymerization.

As for an emulsifier, an anionic surfactant, a nonionic surfactant, a cationic surfactant, an amphoteric surfactant, etc. may be used, but not particularly limited thereto. Among these, an anionic surfactant selected from the group consisting of alkylbenzene sulfonic acid salt, aliphatic sulfonic acid salt, sulfuric acid ester salt of higher alcohol, α-olefin sulfonic acid salt and alkyl ether sulfuric acid ester salt, may be used.

In this regard, the amount of emulsifier used is 0.3 to 10 parts by weight, for example, 0.8 to 8 parts by weight, or 1.5 to 6 parts by weight, based on 100 parts by weight of monomers constituting a carbonic acid-modified nitrile-based copolymer. If the amount is less than the above ranges, the stability at the time of polymerization is lowered. On the contrary, if the amount is more than the above ranges, it may cause a problem of excessive foaming, thereby making it difficult to produce a dip-molded article.

As for a polymerization initiator, a radical initiator may be used, but not particularly limited thereto. Examples of a radical initiator may include one or more selected from the group consisting of inorganic peroxide such as sodium persulfate, potassium persulfate, ammonium persulfate, potassium perphosphate, hydrogen peroxide, etc.; organic peroxide such as t-butyl peroxide, cumene hydroperoxide, p-menthol hydroperoxide, di-t-butyl peroxide, t-butyl cumyl peroxide, acetyl peroxide, isobutyl peroxide, octanoyl peroxide, dibenzoyl peroxide, 3,5,5-trimethylhexanol peroxide, t-butyl peroxyisobutyrate, etc.; azobisisobutyronitrile, azobis-2,4-dimethylvaleronitrile, azobiscyclohexanecarbonitrile, and azobis isobutyric acid methyl, and among these, inorganic peroxide, for example, persulfates may be used.

The amount of polymerization initiator used is 0.01 to 2 parts by weight, for example, 0.02 to 1.5 parts by weight, based on 100 parts by weight of total monomers constituting a carbonic acid-modified nitrile-based copolymer. If the amount is less than the above ranges, polymerization rate is lowered, thereby making it difficult to produce the final product. On the contrary, if the amount is more than the above ranges, the polymerization rate becomes too fast, thereby making it difficult to control polymerization.

An activating agent may be used and may include one or more selected from the group consisting of sodium formaldehyde sulfoxylate, sodium ethylenediamine tetraacetate, ferrous sulfate, dextrose, sodium pyrophosphate and sodium sulfite.

As for a molecular weight regulator, its examples may include, but are not limited to, mercaptan such as α-methylstyrene dimer, t-dodecyl mercaptan, n-dodecyl mercaptan, octyl mercaptan, etc.; halogenated hydrocarbon such as carbon tetrachloride, methylene chloride, methylene bromide, etc.; sulfur-containing compound such as tetraethylthiuram disulfide, dipentamethylenethiuram disulfide, diisopropylkisantigen disulfide, etc.

Such molecular weight modifier may be used alone or in combination of two or more. Among these, mercaptan, for example, t-dodecyl mercaptan may be used. The amount of molecular weight modifier used may vary depending on its type, but it is, for example, 0.1 to 2.0 parts by weight, or 0.2 to 1.5 parts by weight, or 0.3 to 1.0 parts by weight, based on 100 parts by weight of total monomers constituting a carbonic acid-modified nitrile-based copolymer. If the amount is less than the above-mentioned ranges, the physical properties of the resulting dip-molded article are significantly deteriorated. On the contrary, if the amount is more than the above ranges, the polymerization stability is lowered.

In addition, other additives, such as a chelating agent, a dispersing agent, a pH adjusting agent, an oxygen scavenger, a particle size regulating agent, an anti-aging agent, an oxygen scavenger, etc., may be added at the time of polymerization of a latex according to any embodiment of the present disclosure.

The method for introducing a monomer mixture constituting a carbonic acid-modified nitrile-based copolymer may include a method of introducing a monomer mixture into the polymerization reactor all at once, a method of continuously introducing a monomer mixture into the polymerization reactor, a method of introducing a portion of a monomer mixture into the polymerization reactor and supplying the remaining portion continuously to the polymerization reactor, and any of these methods may be used.

The polymerization temperature at the time of emulsion polymerization may be 10 to 90° C., for example, 20 to 80° C., or 25 to 75° C.

The conversion at the time of terminating the polymerization reaction may be 90% or more, for example, 92 to 99.9%, and after the polymerization reaction has terminated, unreacted monomers are removed and the solid concentration and pH are adjusted to obtain a carbonic acid-modified nitrile-based copolymer latex for dip-molding.

Such carbonic acid-modified nitrile-based copolymer latex has a glass transition temperature of −50 to −15° C., for example, −45 to −20° C. If the glass transition temperature of the latex is less than the above ranges, the tensile strength is significantly lowered or the wearing sensation becomes worse due to the stickiness of a glove. On the contrary, if the glass transition temperature of the latex is more than the above ranges, undesirable cracks of a dip-molded article occur. The glass transition temperature may be adjusted by controlling the amount of conjugated diene monomer, and may be measured by Differential Scanning Calorimetry.

The average particle size of the carbonic acid-modified nitrile-based copolymer latex may be 50 to 500 nm, for example, 50 to 300 nm, or 100 to 200 nm. When the average particle diameter of the latex for dip-molding is within the above-mentioned ranges, the viscosity of the latex is not increased, so that the latex may be produced at a high concentration and the tensile strength of the produced dip-molded article may be improved. The average particle size of the latex for dip-molding may be adjusted by controlling the type and amount of emulsifier, and the average particle size may be measured by Laser Scattering Analyzer (Nicomp).

Solid concentration of the latex composition for dip-molding according to any embodiment of the present disclosure may 30 to 60% by weight. If the concentration is too low, the transportation efficiency for a latex composition is deteriorated. If the concentration is too high, the solid concentration may lead to increased viscosity, thereby causing problems such as storage stability, etc.

In this regard, the glass transition temperature may be adjusted depending on the amount of conjugated diene monomer, and the average particle diameter may be adjusted depending on the type and amount of emulsifier.

Latex Composition for Dip-Molding

The above-mentioned carbonic acid modified nitrile-based copolymer latex according to the present disclosure can be applied as a latex composition for dip-molding to produce a dip-molded article.

A composition for dip-molding may be produced by adding, to a carbonic acid-modified nitrile-based copolymer latex composition, an additive, which is commonly used for dip-molding, such as a sulfur cross-linking agent for dip-molding, a vulcanization accelerator, a metal oxide such as zinc oxide, an inorganic pigment, a filler such as silica, a thickener, a pH adjusting agent such as ammonia or alkali hydroxide, etc.

In particular, the latex composition for dip-molding according to the present disclosure may contain an inorganic pigment.

The use of inorganic pigments offers the advantage of lowering the cost while maintaining the thickness of the dip-molded article. Any of these inorganic pigments may be used as long as they are used in the latex composition for dip-molding, and are not particularly limited in the present disclosure. For example, calcium carbonate, kaolin clay, talc, barium sulfate, alumina, aluminum hydroxide, titanium dioxide, white carbon, magnesium oxide and the like can be used, and calcium carbonate is preferably used.

The inorganic pigment is used in an amount of 30 parts by weight, preferably 15 parts by weight or less, based on 100 parts by weight of the carbonic acid-modified nitrile-based copolymer latex. There is a method of adding a nonionic emulsifier to enhance the stability of the inorganic pigment. However, there may be a problem that a large amount of emulsifier residue is present in the glove manufactured along with the foam during the production of the glove. Accordingly, the dispersion stability of the inorganic pigment can be improved due to the presence of the starch, which is a particle stabilizer, and the problems caused by the use of a large amount of emulsifier can be solved.

In addition, the latex composition for dip-molding comprising the additive such as the inorganic pigment may have a solid concentration of 10 to 70% by weight.

If the solids concentration is too low, it is difficult to manufacture gloves having sufficient glove properties. If the solids concentration is too high, the consumption of latex increases, the cost rises and viscosity may rise, which may cause problems such as storage stability. Thus, the solids concentration is appropriately adjusted to be within the above ranges. The range may be preferably 12 to 50% by weight, and more preferably 15 to 40% by weight.

The pH of a latex composition for dip-molding may be 8 to 12, for example, 9 to 11, or 9.3 to 10.5. If the pH is out of the above ranges, the stability of the production process and the physical properties of the glove for the latex composition for dip-molding may be decreased.

In this regard, the pH of a latex composition for dip-molding may be adjusted by adding a certain amount of a pH adjusting agent in the production of a latex for dip-molding. For a pH adjusting agent, 1 to 5% aqueous solution of potassium hydroxide or 1 to 5% ammonia water may be used.

Dip-Molded Article

The above-proposed latex composition for dip-molding enables a dip-molded article to be produced through a dip-molding process.

Particularly, the latex composition for dip-molding according to the present article exhibits high dispersion stability even with the addition of inorganic pigments such as calcium carbonate, minimizes the generation of coagulated material, cannot significantly generate pinholes in the glove after dip-molding, the use of the above-mentioned calcium carbonate can greatly reduce the cost.

In addition, a latex composition for dip-molding according to any embodiment of the present disclosure may ensure, for example, a uniform thickness and superior physical properties even when a molded article is produced to have a thickness of tens to hundreds of microns.

In addition, thanks to slow syneresis, the workability is improved during the dip-molding process, which overcomes the problems that have occurred previously in the case of performing the process at a low concentration including lowered workability due to fast syneresis and resulting high defect rate in the production of the product.

As a dip-molding method for obtaining a dip-molded article according to any embodiment of the present disclosure, any conventional method may be used, such as a direct immersion method, an anode adhesion immersion method, a Teague adhesion immersion method, etc. Among these, an anode adhesion immersion method is, for example, used since a dip-molded article having a uniform thickness may be easily obtained.

The method of producing a dip-molded article using the composition according to any embodiment of the present disclosure includes the steps of:

a) coating the surface of a mold with a coagulant solution;
b) coating the coagulant-coated mold with a latex composition for dip-molding to form a dip-molded layer;
c) cross-linking the dip-molded layer; and
d) peeling off the cross-linked dip-molded layer from the mold to obtain a dip-molded article.

Hereinafter, a method for producing a dip-molded article using a latex composition according to any embodiment of the present disclosure will be described in detail.

Step (a) Coating the Surface of Mold with Coagulant

In this step (a), a process of applying a coagulant to the surface of a mold is carried out by using a hand-shaped mold for dip-molding as a mold, coating the mold with a coagulant solution and then drying the mold.

Examples of coagulant includes metal halides such as barium chloride, calcium chloride, magnesium chloride, zinc chloride, aluminum chloride, etc.; nitrates such as barium nitrate, calcium nitrate, zinc nitrate, etc.; acetic acid salts such as barium acetate, calcium acetate, zinc acetate, etc.; sulfate such as calcium sulfate, magnesium sulfate, aluminum sulfate, etc. Among these, calcium chloride and calcium nitrate may be used. The coagulant solution is a solution in which the above enumerated coagulant is dissolved in water, alcohol or a mixture thereof. The concentration of coagulant in the coagulant solution is usually from 5 to 50% by weight, for example from 10 to 40% by weight.

Step (b) Forming Dip-Molded Layer in the Mold

Following above step (a), this step (b) is carried out by immersing a coagulant-adhered mold in the latex composition for dip-molding according to any embodiment of the present disclosure to form a dip-molded layer.

The coagulant-adhered mold is immersed in the latex composition for dip-molding made of the latex resin composition according to any embodiment of the present disclosure, and then the mold is taken out to have a dip-molded layer formed in the mold.

Step (c) Cross-Linking Dip-Molded Layer

Next, in this step (c), a step of cross-linking the latex resin is carried out by heat-treating the dip-molded layer formed in the mold.

The cross-linking is carried out through a heat treatment, in which treatment the water component first evaporates and curing is done through cross-linking Step (d) Obtaining Dip-Molded Article and Measuring the Physical Properties Thereof Subsequently, in this step (d), a dip-molded article is obtained from the mold, and the physical properties of the obtained dip-molded article are measured.

A dumbbell-shaped specimen is produced from the obtained dip-molded article in accordance with ASTM D-412. The specimen is pulled at an extension rate of 500 mm/min using UTM (Universal Testing Machine) and the tensile strength at break and elongation at break is measured. The tactile sensation is measured by the stress when the elongation is 300% and 500%.

The method according to any embodiment of the present disclosure may be used for any latex article which might be produced by any known dip-molding process. Specifically, it may be applied to any dip-molded latex article selected from health care articles such as surgical gloves, inspection gloves, condoms, catheters or various kinds of industrial and household gloves.

Hereinafter, for a better understanding, the invention is described by way of examples. However, the following examples are provided only to illustrate the invention. Thus, it will be apparent to those skilled in the art that variations and modifications may be made without departing from the scope and spirit of the invention. Furthermore, such variations and modifications are considered to be within the purview and scope of the appended claims.

Preparation Example 1: Preparation of Starch with Controlled Molecular Weight A 5 L reactor equipped with a stirrer, a thermometer, a condenser, an inlet of nitrogen gas, and a feed inlet was purged with nitrogen, 5 parts by weight of sulfuric acid and 100 parts by weight of ion-exchanged water were added to 100 parts by weight of starch (Zen Coat of Samyang Genex Co., Ltd.) widely used for paper coating in the market, and the temperature was raised to 80° C.

The mixture was then stirred for 8 hours to obtain a starch solution having a controlled molecular weight. The starch solution having the above molecular weight was found to have a solid content of 49% and a viscosity of 20 cps, and the weight average molecular weight of the starch was 1060 g/mol.

Preparation Example 2: Preparation of Starch with Controlled Molecular Weight A 5 L reactor equipped with a stirrer, a thermometer, a condenser, an inlet of nitrogen gas, and a feed inlet was purged with nitrogen, 12.5 parts by weight of sulfuric acid and 100 parts by weight of ion-exchanged water were added to 100 parts by weight of starch (Zencoat of Samyang Genex Co., Ltd.) widely used for paper coating in the market, and the temperature was raised to 60° C.

The mixture was then stirred for 15 hours to obtain a starch solution having a controlled molecular weight. The starch solution having the above molecular weight was found to have a solid content of 49% and a viscosity of 270 cps, and the weight average molecular weight of the starch was 7580 g/mol.

Example 1: Production of Latex Composition for Dip-Molding and Dip-Molded Article A carbonic acid-modified nitrile-based copolymer latex was prepared using 10 parts by weight of the starch solution prepared in Preparation Example 1, and a composition for dip-molding and a dip-molded article were prepared using the latex.

(Production of Carbonic Acid-Modified Nitrile-Based Copolymer Latex Containing Starch)

A 10 L high-pressure reactor, equipped with a stirrer, a thermometer, a cooler and a nitrogen gas inlet, and adapted for continuous addition of monomers, an emulsifier and a polymerization initiator, was replaced with nitrogen, and 10 parts by weight (49% concentration) of the starch solution whose molecular weight was controlled, 2.5 parts by weight of sodium alkylbenzene sulfonate, 0.5 part by weight of t-dodecyl mercaptan and 140 parts by weight of ion-exchanged water were added to 100 parts by weight of a monomer mixture including 25% by weight of acrylonitrile, 70% by weight of 1,4-butadiene and 5% by weight of methacrylic acid, and the temperature was elevated to 40° C.

0.25 parts by weight of potassium persulfate, which is a polymerization initiator, was added thereto. When the conversion reached 95%, 0.1 parts by weight of sodium dimethyl dithiocarbamate was added to terminate the polymerization. Unreacted monomers were removed through a stripping process, and ammonia water, an antioxidant, a defoaming agent, etc. were added to obtain and a carbonic acid-modified nitrile-based copolymer latex (hereinafter referred to as latex-A) containing starch having a solid concentration of 45% and a pH of 8.5.

The average particle size and glass transition temperature of the produced latex were measured. The average particle size was measured by Laser Scattering Analyzer (Nicomp), and the glass transition temperature was measured by Differential Scanning Calorimetry.

As a result of analysis, the produced latex had a glass transition temperature of −35° C. and an average particle diameter of 130 nm.

(Production of Latex Composition for Dip-Molding)

10 parts by weight of calcium carbonate, 3% potassium hydroxide solution and an appropriate amount of secondary distilled water were added to 100 parts by weight of the latex-A prepared above to obtain a latex composition for dip-molding with a solid concentration of 30% and a pH of 10.0.

(Production of Dip-Molded Article)

12 parts by weight of calcium nitrate, 87.5 parts by weight of distilled water and 0.5 parts by weight of a wetting agent (Teric 320, produced by Huntsman Corporation, Australia) were mixed to produce a coagulant solution. A hand-shaped ceramic mold was immersed in this solution for 1 minute, taken out of it, dried at 80° C. for 3 minutes, and a coagulant-applied hand-shaped mold was obtained.

Next, the mold to which the coagulant was applied was immersed in a latex composition for dip-molding for 1 minute, lifted up out of it, and dried at 120° C. for 4 minutes, and then immersed in hot water for 3 minutes. The mold was dried again at 120° C. for 3 minutes and then crosslinked at 130° C. for 20 minutes. The crosslinked dip-molded layer was peeled off from the hand-shaped mold to measure stickiness and the hand-shaped dip-molded article was obtained.

Example 2: Production of Latex Composition for Dip-Molding and Dip-Molded Article 10 parts by weight of the starch solution prepared in Preparation Example 2 was used to prepare a carbonic acid-modified nitrile-based copolymer latex, and a composition for dip-molding and a dip-molded article were prepared using the latex.

(Production of Carbonic Acid-Modified Nitrile-Based Copolymer Latex Containing Starch)

A 10 L high-pressure reactor, equipped with a stirrer, a thermometer, a cooler and a nitrogen gas inlet, and adapted for continuous addition of monomers, an emulsifier and a polymerization initiator, was replaced with nitrogen, and 10 parts by weight (49% concentration) of the starch solution whose molecular weight was controlled, 2.5 parts by weight of sodium alkylbenzene sulfonate, 0.5 parts by weight of t-dodecyl mercaptan and 140 parts by weight of ion-exchanged water were added to 100 parts by weight of a monomer mixture including 25% by weight of acrylonitrile, 70% by weight of 1,4-butadiene and 5% by weight of methacrylic acid, and the temperature was elevated to 40° C.

0.25 parts by weight of potassium persulfate, which is a polymerization initiator, was added thereto. When the conversion reached 95%, 0.1 parts by weight of sodium dimethyl dithiocarbamate was added to terminate the polymerization. Unreacted monomers were removed through a stripping process, and ammonia water, an antioxidant, a defoaming agent, etc. were added to obtain and a carbonic acid-modified nitrile-based copolymer latex (hereinafter referred to as latex-B) containing starch having a solid concentration of 45% and a pH of 8.5.

The average particle size and glass transition temperature of the produced latex were measured. The average particle size was measured by Laser Scattering Analyzer (Nicomp), and the glass transition temperature was measured by Differential Scanning Calorimetry.

As a result of analysis, the produced latex had a glass transition temperature of −35° C. and an average particle diameter of 135 nm.

(Production of Latex Composition for Dip-Molding)

10 parts by weight of calcium carbonate, 3% potassium hydroxide solution and an appropriate amount of secondary distilled water were added to 100 parts by weight of the latex-B prepared above to obtain a latex composition for dip-molding with a solid concentration of 30% and a pH of 10.0.

(Production of Dip-Molded Article)

12 parts by weight of calcium nitrate, 87.5 parts by weight of distilled water and 0.5 parts by weight of a wetting agent (Teric 320, produced by Huntsman Corporation, Australia) were mixed to produce a coagulant solution. A hand-shaped ceramic mold was immersed in this solution for 1 minute, taken out of it, dried at 80° C. for 3 minutes, and a coagulant-applied hand-shaped mold was obtained.

Next, the mold to which the coagulant was applied was immersed in a latex composition for dip-molding for 1 minute, lifted up out of it, and dried at 120° C. for 4 minutes, and then immersed in hot water for 3 minutes. The mold was dried again at 120° C. for 3 minutes and then crosslinked at 130° C. for 20 minutes. The crosslinked dip-molded layer was peeled off from the hand-shaped mold to measure stickiness and the hand-shaped dip-molded article was obtained.

Example 3: Production of Latex Composition for Dip-Molding and Dip-Molded Article 10 parts by weight of the starch solution prepared in Preparation Example 1 was used to adjust the monomer content ratio to prepare a carbonic acid-modified nitrile-based copolymer latex, and a composition for dip-molding and a dip-molded article were prepared using the same.

(Production of Carbonic Acid-Modified Nitrile-Based Copolymer Latex Containing Starch)

A 10 L high-pressure reactor, equipped with a stirrer, a thermometer, a cooler and a nitrogen gas inlet, and adapted for continuous addition of monomers, an emulsifier and a polymerization initiator, was replaced with nitrogen, and 10 parts by weight (49% concentration) of the starch solution whose molecular weight was controlled, 3 parts by weight of sodium alkylbenzene sulfonate, 0.5 part by weight of t-dodecyl mercaptan and 140 parts by weight of ion-exchanged water were added to 100 parts by weight of a monomer mixture including 35% by weight of acrylonitrile, 60% by weight of 1,4-butadiene and 5% by weight of methacrylic acid, and the temperature was elevated to 40° C.

0.3 parts by weight of potassium persulfate, which is a polymerization initiator, was added thereto. When the conversion reached 95%, 0.1 parts by weight of sodium dimethyl dithiocarbamate was added to terminate the polymerization. Unreacted monomers were removed through a stripping process, and ammonia water, an antioxidant, a defoaming agent, etc. were added to obtain and a carbonic acid-modified nitrile-based copolymer latex (hereinafter referred to as latex-C) containing starch having a solid concentration of 45% and a pH of 8.5.

The average particle size and glass transition temperature of the produced latex were measured. The average particle size was measured by Laser Scattering Analyzer (Nicomp), and the glass transition temperature was measured by Differential Scanning Calorimetry.

As a result of analysis, the produced latex had a glass transition temperature of −22° C. and an average particle diameter of 130 nm.

(Production of Latex Composition for Dip-Molding)

10 parts by weight of calcium carbonate, 3% potassium hydroxide solution and an appropriate amount of secondary distilled water were added to 100 parts by weight of the latex-B prepared above to obtain a latex composition for dip-molding with a solid concentration of 30% and a pH of 10.0.

(Production of Dip-Molded Article)

12 parts by weight of calcium nitrate, 87.5 parts by weight of distilled water and 0.5 parts by weight of a wetting agent (Teric 320, produced by Huntsman Corporation, Australia) were mixed to produce a coagulant solution. A hand-shaped ceramic mold was immersed in this solution for 1 minute, taken out of it, dried at 80° C. for 3 minutes, and a coagulant-applied hand-shaped mold was obtained.

Next, the mold to which the coagulant was applied was immersed in a latex composition for dip-molding for 1 minute, lifted up out of it, and dried at 120° C. for 4 minutes, and then immersed in hot water for 3 minutes. The mold was dried again at 120° C. for 3 minutes and then crosslinked at 130° C. for 20 minutes. The crosslinked dip-molded layer was peeled off from the hand-shaped mold to measure stickiness and the hand-shaped dip-molded article was obtained.

Example 4: Production of Latex Composition for Dip-Molding and Dip-Molded Article Except that 30 parts by weight of the starch solution prepared in Preparation Example 1 was used, the carbonic acid-modified nitrile-based copolymer latex (Latex-D) was produced in the same manner as in Example 1, and a composition for dip-molding and a dip-molded article were produced using the same.

The produced carbonic acid-modified nitrile-based copolymer latex (latex-D) had a glass transition temperature of −35° C. and an average particle size of 136 nm.

Example 5: Production of Latex Composition for Dip-Molding and Dip-Molded Article Except that 30 parts by weight of the starch solution prepared in Preparation Example 2 was used, the carbonic acid-modified nitrile-based copolymer latex (Latex-E) was produced in the same manner as in Example 2, and a composition for dip-molding and a dip-molded article were produced using the same.

The produced carbonic acid-modified nitrile-based copolymer latex (latex-E) had a glass transition temperature of −35° C. and an average particle size of 138 nm.

Example 6: Production of Latex Composition for Dip-Molding and Dip-Molded Article Except that 30 parts by weight of the starch solution prepared in Preparation Example 1 was used, the carbonic acid-modified nitrile-based copolymer latex (Latex-F) was produced in the same manner as in Example 3, and a composition for dip-molding and a dip-molded article were produced using the same.

The produced carbonic acid-modified nitrile-based copolymer latex (latex-F) had a glass transition temperature of −24° C. and an average particle size of 137 nm.

Comparative Example 1: Production of Latex Composition for Dip-Molding and Dip-Molded Article Without using starch, the carbonic acid-modified nitrile-based copolymer latex (Latex-G) was produced in the same manner as in Example 1, and a composition for dip-molding and a dip-molded article were produced using the same.

The produced carbonic acid-modified nitrile-based copolymer latex (latex-G) had a glass transition temperature of −37° C. and an average particle size of 127 nm.

Comparative Example 2: Production of Latex Composition for Dip-Molding and Dip-Molded Article Without using starch, the carbonic acid-modified nitrile-based copolymer latex (Latex-H) was produced in the same manner as in Example 3, and a composition for dip-molding and a dip-molded article were produced using the same.

The produced carbonic acid-modified nitrile-based copolymer latex (latex-H) had a glass transition temperature of −25° C. and an average particle size of 126 nm.

Comparative Example 3: Production of Latex Composition for Dip-Molding and Dip-Molded Article The starch was mixed with the latex prepared after copolymerization rather than the copolymerization process to prepare a latex composition for dip-molding and a dip-molded article.

100 parts by weight of latex-G of Comparative Example 1 and 10 parts by weight of the starch solution prepared in Preparation Example 1 were simply mixed to prepare a latex composition. A dip-molded article was prepared in the same manner as in Example 1 using the latex composition prepared above.

Comparative Example 4: Production of Latex Composition for Dip-Molding and Dip-Molded Article The starch was mixed with the latex prepared after copolymerization rather than the copolymerization process to prepare a latex composition for dip-molding and a dip-molded article.

100 parts by weight of latex-H of Comparative Example 2 and 30 parts by weight of the starch solution prepared in Preparation Example 2 were simply mixed to prepare a latex composition. A dip-molded article was prepared in the same manner as in Example 1 using the latex composition prepared above.

Experimental Example 1: Measurement of Physical Properties of Latex Composition for Dip-Molding and Dip-Molded Article The physical properties of latex composition for dip-molding and dip-molded article produced in the above Examples and Comparative Examples were measured, and the results are shown in Table 1 below.

(1) Dispersion Stability

The latex compositions for dip-molding prepared in Examples 1 to 6 and Comparative Examples 1 to 4 were mixed at room temperature for 24 hours in order to confirm the dispersion stability of the latex composition for dip-molding in which calcium carbonate was added as an inorganic pigment. At this time, calcium carbonate was used in an amount of 10 parts by weight per 100 parts by weight (solid content: 30% by weight) of each latex composition.

Each latex composition was then filtered through 80 mesh and 200 mesh to determine the amount of coagulum. At this time, the content of the solidified product is low, which means that the stability of calcium carbonate is excellent.

(2) Measurement of Syneresis (Sec)

In order to confirm the syneresis time, a coagulant-applied mold was immersed in the above-described latex composition for dip-molding of Examples 1 to 6 and Comparative Examples 1 to 4 for 1 minute, lifted up out of it, dried at 145° C. for 6 minutes, and the syneresis time was determined by confirming how long water droplets fall down. At this time, the longer the duration of the syneresis, the better the syneresis.

(3) Stickiness (10-Point Scoring Method)

When a dip-molded article was produced, the stickiness was indicated by a 10-point scoring method while peeling off a dip-molded layer from the hand-shaped mold. The higher the score is, the less the stickiness is.

(4) Measurement of Tensile Strength

According to the ASTM D638 method, the specimen was pulled at a cross head speed of 500 mm/min using a test instrument U.T.M (manufactured by Instron, model name: 4466), and the point, at which the specimen was cut, was measured. The tensile strength was calculated by the following equation:

Tensile strength $(kgf/mm^2)$=load value (kgf)/(thickness (m)×width (mm))

TABLE 1

| | Solidification product content (ppm) | Syneresis (sec) | Stickiness (10-point scoring method) | tensile strength (MPa) |
|---|---|---|---|---|
| Example 1 | 27 | 205 | 9 | 28.7 |
| Example 2 | 21 | 237 | 9 | 28.2 |
| Example 3 | 28 | 215 | 10 | 32.5 |
| Example 4 | 16 | 290 | 10 | 29.9 |
| Example 5 | 15 | 303 | 10 | 30.2 |
| Example 6 | 12 | 289 | 10 | 33.4 |
| Comparative Example 1 | 2505 | 27 | 5 | 25.0 |
| Comparative Example 2 | 2349 | 39 | 6 | 28.9 |
| Comparative Example 3 | 892 | 197 | 9 | 26.3 |
| Comparative Example 4 | 730 | 208 | 9 | 29.8 |

As shown in Table 1, in the case of the dip-molded articles of Examples 1 to 6, in which the starch with controlled molecular weight in this present disclosure was used in polymerization, the coagulated product was found to be 30 ppm or less, indicating that the dispersion stability to calcium carbonate was excellent.

In contrast, in the case of Comparative Examples 1 to 4, it was found that coagulation products of several hundreds of times or more were generated at the maximum and dispersion stability was low. In addition, it can be seen that the dip-molded articles of Examples 1 to 6 are significantly improved in syneresis, stickiness and tensile strength characteristics as compared with Comparative Examples 1 and 2.

In the case of Comparative Examples 3 and 4, when the starch was used after preparing the latex, the syneresis, stickiness and tensile strength properties were improved to some extent, but it can be seen that the dispersion stability to calcium carbonate is still low at a maximum content of 892 ppm.

The carbonic acid-modified nitrile-based copolymer latex according to the present disclosure can be used in the production of latex articles such as various industrial and household gloves such as health care products through the dip-molding process.

The invention claimed is:

1. A carbonic acid-modified nitrile-based copolymer latex which is produced adding starch during copolymerization and has a glass transition temperature of −50 to −15° C. and an average particle diameter of 50 to 500 nm, wherein the starch has a weight-average molecular weight of 300 to 30,000 g/mol.

2. The latex of claim 1, wherein the starch is added in an amount of 1 to 30 parts by weight based on 100 parts by weight of the total amount of the monomers.

3. The latex of claim 1, wherein the starch includes one selected from the group consisting of rice starch, barley starch, corn starch, waxy corn starch, tapioca starch, potato starch, sweet potato starch, wheat starch and modified starch thereof.

4. The latex of claim 3, wherein the modified starch includes one selected from the group consisting of oxidized starch, acid-treated starch, ester starch, ether starch, phosphoric acid bridged starch, acetyl adipate acid starch, and combinations thereof.

5. The latex of claim 1, wherein the carbonic acid-modified nitrile-based copolymer is by copolymerization of monomers comprising 40 to 89% by weight of a conjugated diene monomer, 10 to 50% by weight of an ethylenically unsaturated nitrile-based monomer and 0.1 to 10% by weight of an ethylenically unsaturated acid monomer.

6. The latex of claim 5, wherein the conjugated diene monomer includes one selected from the group consisting of 1,3-butadiene, 2,3-dimethyl-1,3-butadiene, 2-ethyl-1,3-butadiene, 1,3-pentadiene, isoprene, and combinations thereof.

7. The latex of claim 5, wherein the ethylenically unsaturated nitrile-based monomer includes one selected from the group consisting of acrylonitrile, methacrylonitrile, fumaronitrile, α-chloronitrile, α-cyanoethyl acrylonitrile, and combinations thereof.

8. The latex of claim 5, wherein the ethylenically unsaturated acid monomer includes one selected from the group consisting of acrylic acid, methacrylic acid, itaconic acid, maleic acid, fumaric acid, maleic anhydride, citraconic anhydride, styrene sulfonic acid, monobutyl fumarate, monobutyl maleate, mono-2-hydroxypropyl maleate, and combinations thereof.

9. The latex of claim 1, wherein the carbonic acid-modified nitrile-based copolymer latex is by copolymerization in which 0.3 to 30 parts by weight of an emulsifier, 0.01 to 2 parts by weight of a polymerization initiator and 0.1 to 2.0 parts by weight of a molecular weight modifier are added, based on 100 parts by weight of the total amount of monomers.

10. A latex composition for dip-molding comprising the carbonic acid-modified nitrile-based copolymer latex according to claim 1.

11. A method of preparing a dip-molded article, said method comprising:
   a) coating the surface of a mold with a coagulant solution;
   b) coating the coagulant-coated mold with a latex composition for dip-molding to form a dip-molded layer;
   c) cross-linking the dip-molded layer; and
   d) peeling off the cross-linked dip-molded layer from the mold to obtain a dip-molded article,
   wherein the latex composition for dip-molding is a latex composition for dip-molding according to claim 10.

* * * * *